(12) United States Patent
Kawakita et al.

(10) Patent No.: US 7,769,528 B2
(45) Date of Patent: Aug. 3, 2010

(54) FUEL INJECTION CONTROLLER FOR ENGINE

(75) Inventors: Koji Kawakita, Ohbu (JP); Katsunori Ueda, Okazaki (JP); Toshiyuki Miyata, Okazaki (JP); Hiroki Yamamoto, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/361,846

(22) Filed: Jan. 29, 2009

(65) Prior Publication Data

US 2009/0248274 A1  Oct. 1, 2009

(30) Foreign Application Priority Data

Mar. 26, 2008  (JP)  ............... P2008-080466

(51) Int. Cl.
*F02D 41/30* (2006.01)
(52) U.S. Cl. .................. 701/104; 123/480; 123/346
(58) Field of Classification Search ......... 701/103–104; 123/90.11, 90.15, 345–346, 478, 480
See application file for complete search history.

(56) References Cited

U.S. PATENT DOCUMENTS

| | | | | |
|---|---|---|---|---|
| 6,062,201 A | * | 5/2000 | Nozawa et al. | 123/478 |
| 6,401,684 B2 | * | 6/2002 | Hori et al. | 123/198 F |
| 6,425,369 B2 | * | 7/2002 | Arai et al. | 123/348 |
| 6,619,266 B2 | * | 9/2003 | Koseki | 123/478 |
| 6,659,054 B2 | * | 12/2003 | Sugiyama et al. | 123/90.16 |
| 6,681,741 B2 | * | 1/2004 | Majima et al. | 123/399 |
| 2008/0110439 A1 | * | 5/2008 | Sugimoto | 123/478 |
| 2009/0157279 A1 | * | 6/2009 | Omuro et al. | 701/103 |

FOREIGN PATENT DOCUMENTS

| | | | |
|---|---|---|---|
| JP | 6-317209 | * | 11/1994 |
| JP | 2005-188293 A | | 7/2005 |
| JP | 2007-56782 | * | 3/2007 |

* cited by examiner

*Primary Examiner*—Hai H Huynh
(74) *Attorney, Agent, or Firm*—Birch, Stewart, Kolasch & Birch LLP

(57) ABSTRACT

A fuel injection controller for an engine that injects fuel to an inlet passage in an upstream side of an inlet valve from a fuel injection unit, includes: a first calculator, configured to calculate a basic fuel injection quantity from the fuel injection unit based on an operating condition of the engine; a second calculator, configured to calculate a first direct transport rate of fuel directly transported into a cylinder of the fuel injected from the fuel injection unit when the inlet valve is closed; a third calculator, configured to calculate a second direct transport rate of fuel directly transported into a cylinder of the fuel injected from the fuel injection unit when the inlet valve is opened; and a corrector, configured to correct the basic fuel injection quantity based on the first direct transport rate and the second direct transport rate.

9 Claims, 9 Drawing Sheets

FUEL INJECTION CONTROLLER FOR ENGINE

BACKGROUND

1. Field of the Invention

The present invention relates to a fuel injection controller for an internal combustion engine and more particularly to a control of a fuel injection quantity in an inlet pipe injection type internal combustion engine that injects fuel to an inlet passage.

2. Description of the Related Art

For instance, as a traveling drive source of a motor vehicle, an inlet pipe injection type internal combustion engine for injecting fuel into an inlet pipe in the upstream side of a fuel injection valve has been hitherto widely employed. In such an internal combustion engine, a fuel injection quantity is controlled in accordance with an operating condition such as an inlet air quantity.

However, a part of the fuel injected from the fuel injection valve may possibly adhere to an inner wall of the inlet pipe. Further, the fuel adhering to the inner wall of the inlet pipe may sometimes evaporate to be transported to a cylinder. Therefore, even when the fuel injection quantity is controlled on the basis of the inlet air quantity, the fuel transported to the cylinder may be insufficient or excessive. Thus, there is a fear that an accident fire may be caused or an exhaust performance may be deteriorated.

Thus, a technique is developed that the fuel adhering to the wall of the inlet pipe and an evaporating part of the fuel adhering to the wall are predicted and the fuel injection quantity from the fuel injection valve is determined by considering the predicted quantities thereof, as disclosed in JP-A-2005-188293.

In the inlet pipe injection type internal combustion engine, the fuel is ordinarily injected during a closing state of an inlet valve. When a large quantity of fuel injection is required, the fuel is injected not only during the closing state of the inlet valve, but also during the opening state of the inlet valve. However, since the flowing state of inlet air in the inlet pipe is extremely different between the opening state of the inlet valve and the closing state of the inlet valve, transport characteristics of the fuel to the cylinder are greatly changed.

Accordingly, as in the above-described patent literature 1, even when the fuel adhering to the wall of the inlet pipe and an evaporating part of the fuel adhering to the wall are predicted and the fuel injection quantity from the fuel injection valve is determined simply by considering the predicted quantities thereof, it is difficult to precisely transport a desired quantity of fuel into the cylinder especially during a transient operation in which the intake air quantity varies.

SUMMARY

It is therefore one advantageous aspect of the invention to provide a fuel injection controller for an inlet pipe injection type internal combustion engine that always precisely controls a transport quantity of fuel into a cylinder even during a transient operation.

According to an aspect of the invention, there is provided a fuel injection controller for an engine that injects fuel to an inlet passage in an upstream side of an inlet valve from a fuel injection unit, the fuel injection controller including: a first calculator, configured to calculate a basic fuel injection quantity from the fuel injection unit based on an operating condition of the engine; a second calculator, configured to calculate a first direct transport rate of fuel directly transported into a cylinder of the fuel injected from the fuel injection unit when the inlet valve is closed; a third calculator, configured to calculate a second direct transport rate of fuel directly transported into the cylinder of the fuel injected from the fuel injection unit when the inlet valve is opened; and a corrector, configured to correct the basic fuel injection quantity based on the first direct transport rate and the second direct transport rate.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
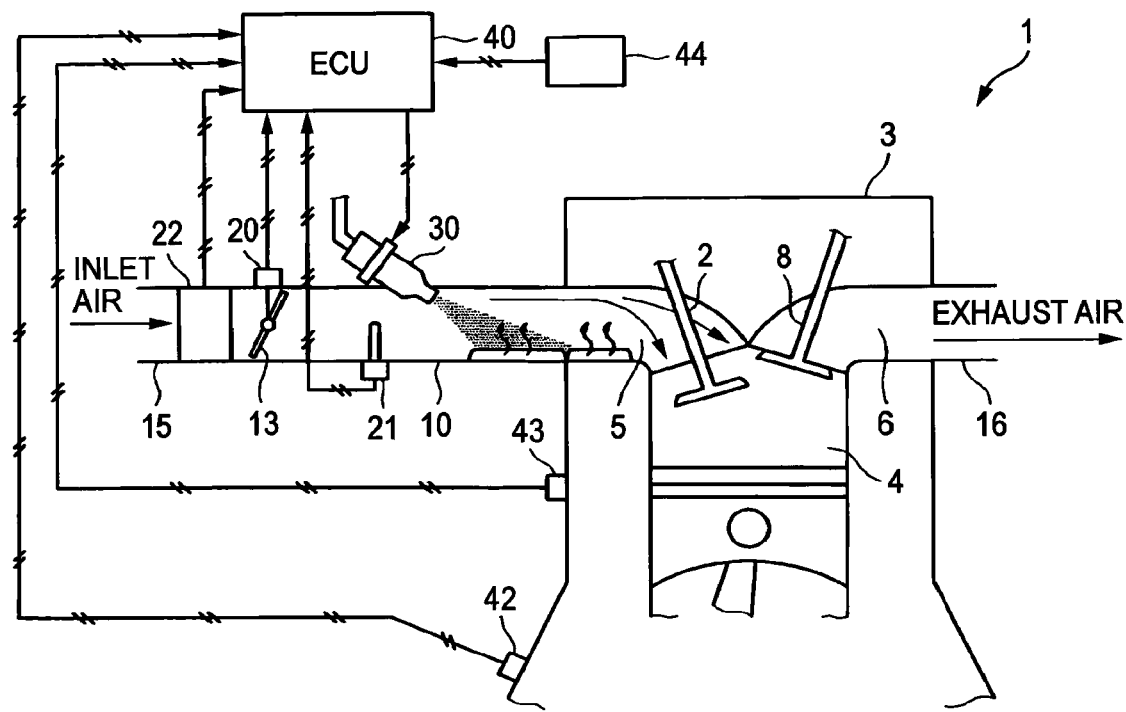
FIG. 1 is a schematic block diagram of an engine having a fuel injection controller according to the present invention.

Now, an embodiment of the present invention will be described below by referring to the drawings.

FIG. 1 is a schematic block diagram of an engine (internal combustion engine) 1 including a fuel injection controller according to the present invention. The engine 1 is an inlet pipe injection type gasoline engine that injects fuel to the upstream side of an inlet valve 2.

As shown in FIG. 1, in a cylinder head 3 of the engine 1, an inlet port 5 and an exhaust port 6 are formed that communicate with a combustion chamber 4 for each cylinder. Further, are provided an inlet valve 2 for opening and closing between the combustion chamber 4 and the inlet port 5 and an exhaust valve 8 for opening and closing between the combustion chamber 4 and the exhaust port 6. The inlet valve 2 and the exhaust valve 8 are driven in accordance with the rotation and drive of the engine 1 by a cam shaft not shown in the drawing.

Further, to the cylinder head 3, one end of an inlet manifold 10 is connected so as to communicate with the inlet port 5. To the other end of the inlet manifold 10, an inlet air introducing inlet pipe 15 is connected through a throttle valve 13 opening and closing depending on the opening degree of an accelerator. On the other hand, to the exhaust port 6, an exhaust pipe is connected through an exhaust manifold 16.

In the throttle valve 13, a throttle sensor 20 for detecting the opening degree of a throttle is provided. In the inlet manifold 10, an inlet air temperature sensor (an inlet air temperature detecting unit) 21 for detecting inlet air temperature is provided. In the inlet pipe 15, an air flow sensor 22 for detecting an inlet air quantity is provided, respectively.

Further, in the engine 1, an electromagnetic fuel injection valve (a fuel injection unit) 30 is provided. The fuel injection valve 30 has a function for injecting fuel supplied from a fuel tank not shown in the drawing to an inlet passage.

An ECU (electronic control unit: a control unit) 40 includes an input and output device, a storage device (ROM, RAM, nonvolatile RAM, etc.), a central processing unit, etc. To the input side of the ECU 40, various kinds of sensors are connected such as a crank angle sensor 42 for detecting a crank angle of the engine 1, a water temperature sensor 43 for detecting the temperature of cooling water of the engine 1, a fuel temperature sensor (a fuel temperature detecting unit) 44 for detecting the temperature of the fuel supplied to the fuel injection valve 30, etc. as well as the throttle sensor 20, the inlet air temperature sensor 21 and the air flow sensor 22, and detected information from these sensors is inputted thereto. The crank angle sensor 42 has a function as a detecting unit for detecting the rotating speed of the engine 1 from a transition of the detected crank angle.

On the other hand, to the output side of the ECU 40, various kinds of devices such as an ignition plug not shown in the drawing are connected as well as the fuel injection valve 30. To the various kinds of output devices, a fuel injection quantity, a fuel injection time, an ignition time or the like calculated in the ECU 40 on the basis of the detected information from the various kinds of sensors are respectively outputted. Thus, a proper quantity of fuel is injected to inlet air at a proper timing and a spark ignition is carried out at a suitable timing.

The ECU 40 adjusts the driving time of the fuel injection valve 30 to control the fuel injection quantity. Accordingly, in this embodiment, the fuel injection quantity from the fuel injection valve 30 and a fuel injection time establish a correlation.

Figure 2:
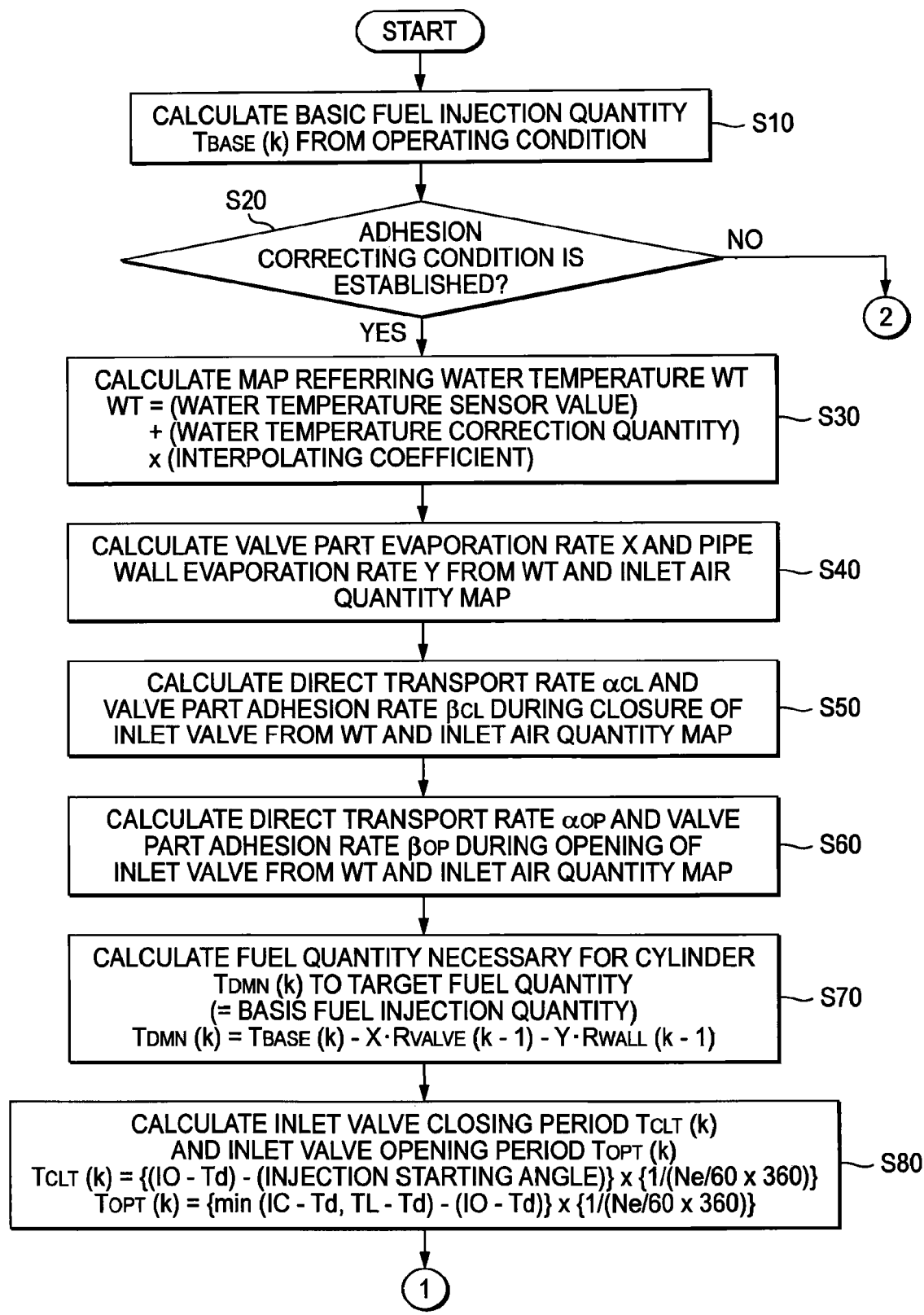
FIG. 2 is a flowchart showing a calculating method of a fuel quantity in an embodiment of the present invention.
Figure 3:
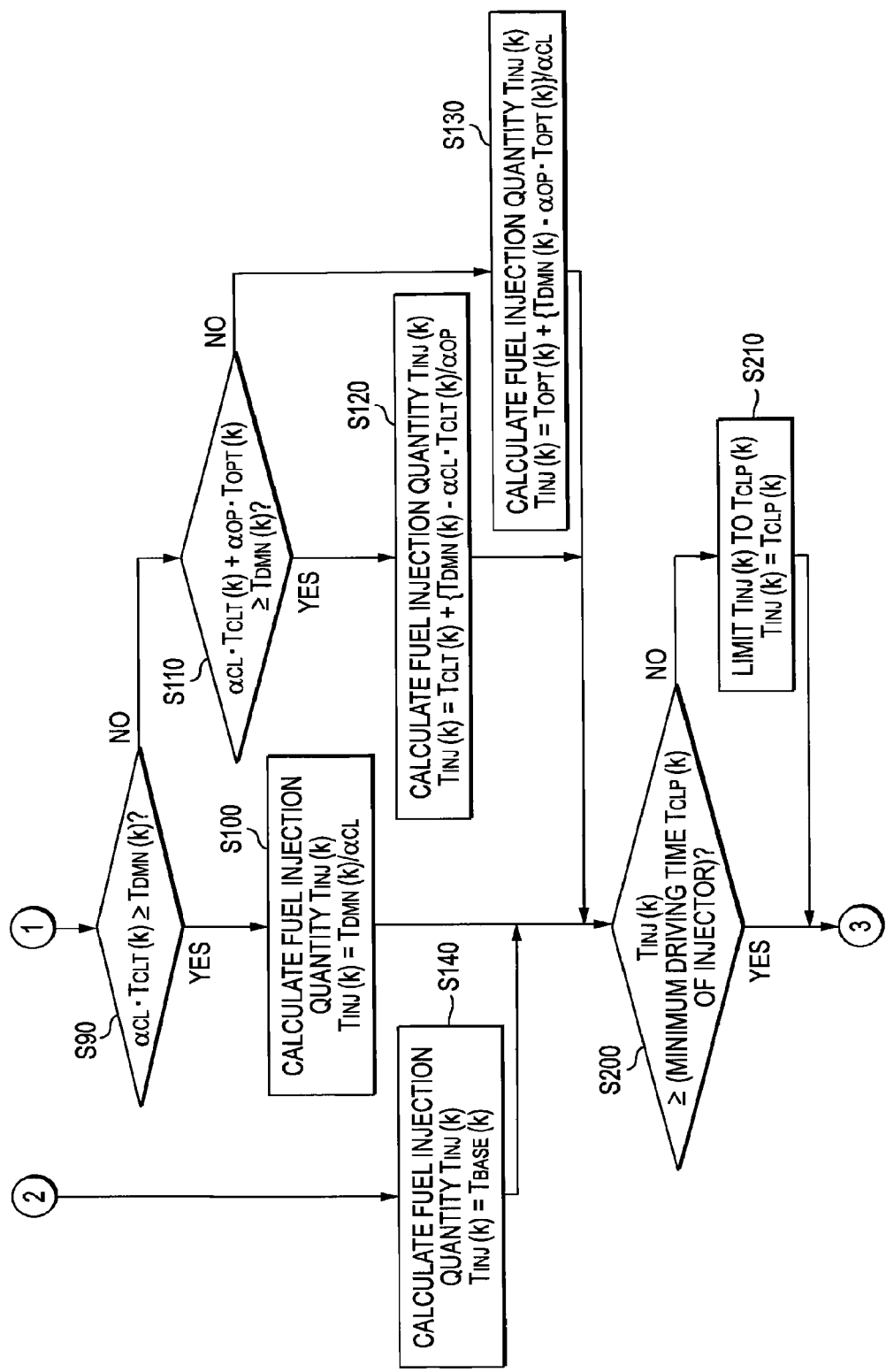
FIG. 3 is a flowchart showing a calculating method of the fuel quantity in the embodiment of the present invention.
Figure 4:
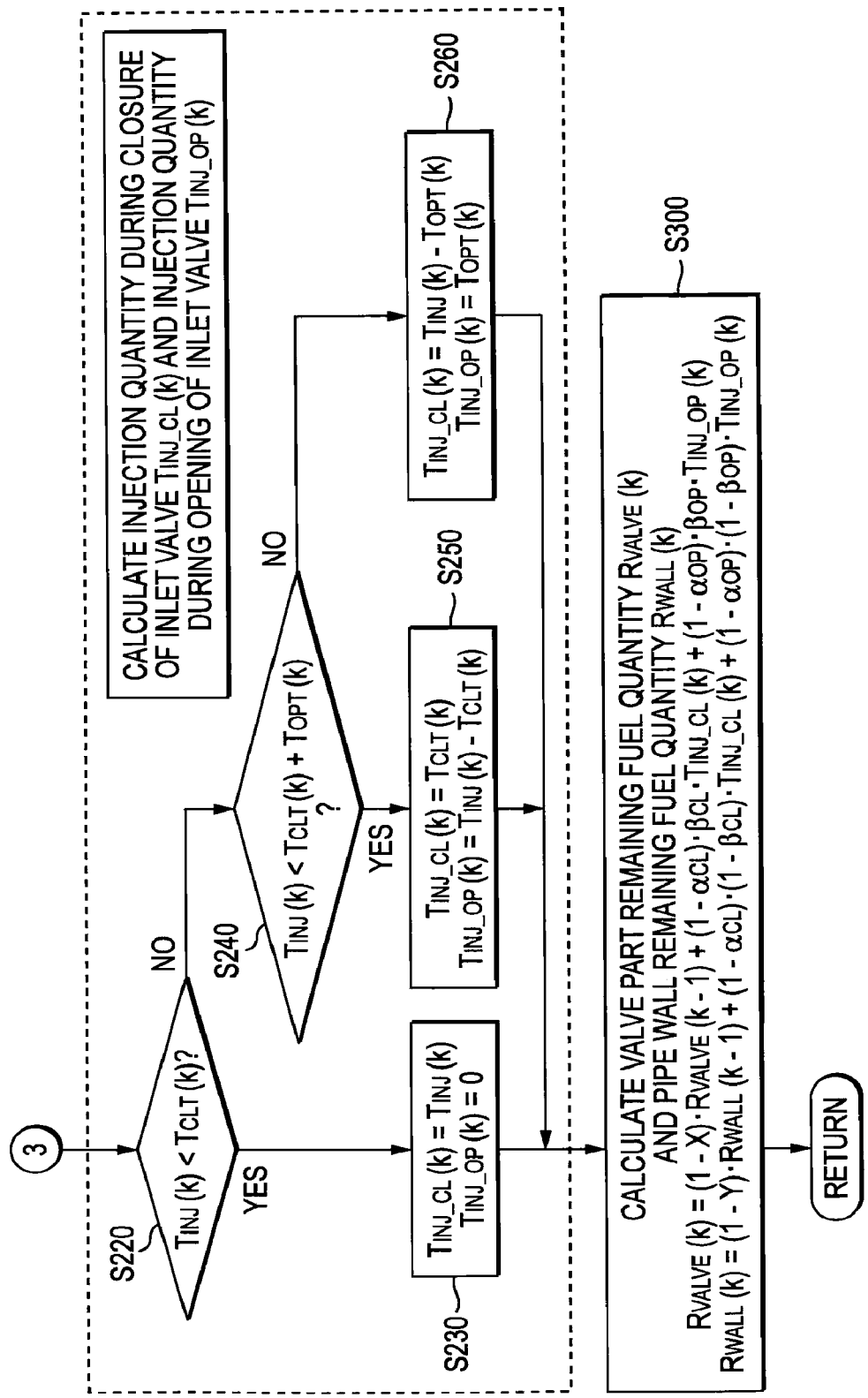
FIG. 4 is a flowchart showing a calculating method of the fuel quantity in the embodiment of the present invention.

FIGS. 2 to 4 are flowcharts showing a calculating method of the fuel injection quantity (the fuel injection time) in the ECU 40 of this embodiment of the present invention. This routine is repeatedly carried out in the ECU 40 during the operation of the engine.

In step S1, a basic fuel injection quantity Tbase(k) is calculated on the basis of operating conditions of the engine 1 (a basic injection quantity calculating unit) The basic fuel injection quantity Tbase(k) is a fuel injection quantity per cycle (a crank angle of 720 CA) before a correction that is injected from the fuel injection valve 30 and corresponds to a target fuel quantity required for a cylinder. As the operating condition of the engine 1, the opening degree of the throttle inputted from the throttle sensor 20 or the rotating speed of the engine obtained by the transition of the crank angle inputted from the crank angle sensor 42 or the like is employed. The basic fuel injection quantity Tbase(k) is obtained on the basis of these operating conditions by using, for instance, a map. Then, the procedure advances to step S20.

In the step S20, it is decided whether or not an adhesion correcting condition is established. The adhesion correcting condition is established when below-described conditions are not established, for instance, when the volumetric efficiency of the engine 1 exceeds a prescribed value, when the fuel injection quantity is so small that an adhesion does not need to be corrected, when the fuel is cut (excluding a time when the fuel of one bank is cut), at the time of a start. α —Ne mode (at the time of a control mode in which the fuel injection quantity is determined from the opening degree of the throttle and the rotating speed of the engine during the failure of the air flow sensor. When the adhesion correcting condition is established, the procedure advances to step S30. In the case of the engine having a turbo charger, a boost pressure may be used in place of the volumetric efficiency.

Figure 5:
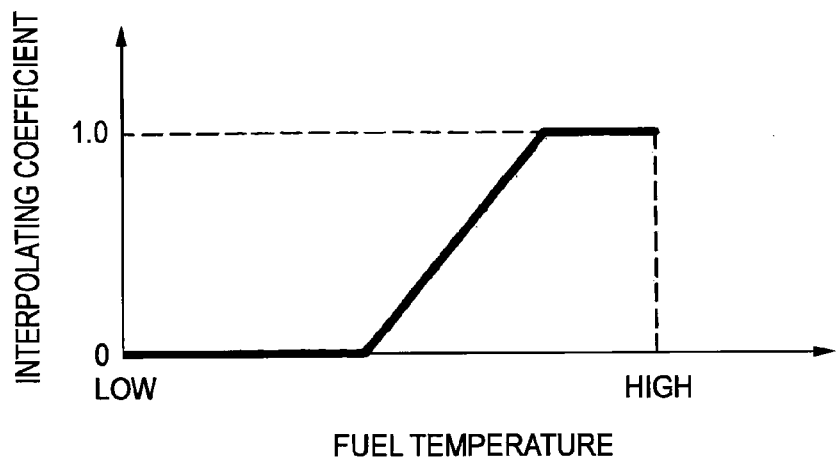
FIG. 5 is a map for calculating an interpolating coefficient of a map referring water temperature.
Figure 6:
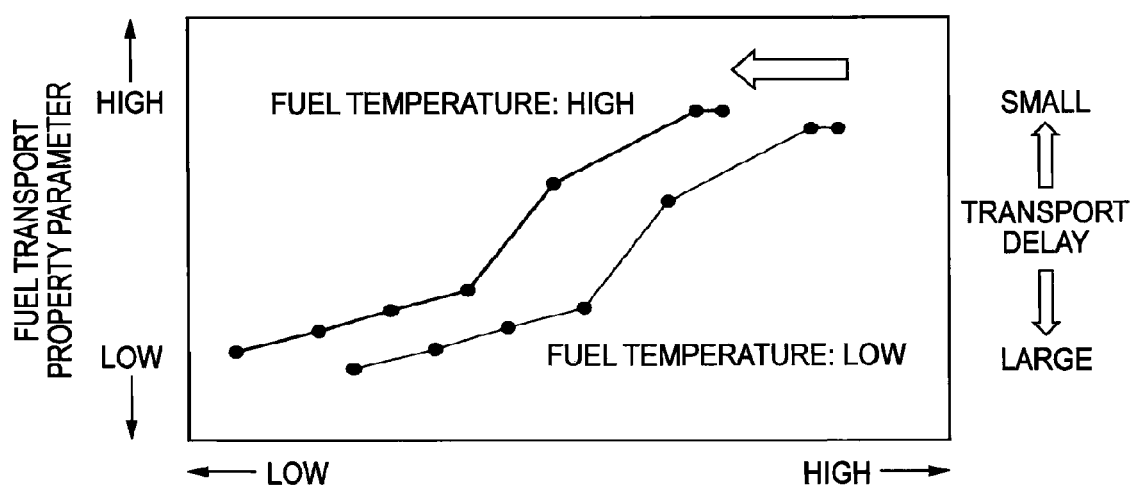
FIG. 6 is a graph showing a relation between a water temperature, a fuel temperature and a fuel transport property parameter.

In the step S30, a map referring water temperature WT is calculated. Specifically, the map referring water temperature WT is obtained by calculating the water temperature detected by the water temperature sensor 43+a water temperature correction quantity×an interpolating coefficient. The water temperature correction quantity is previously set in accordance with the water temperature. The interpolating coefficient is read and set from a map shown in FIG. 5 in accordance with the temperature of the fuel detected by the fuel temperature sensor 44. Then, the procedure advances to step S40. A correction in this step is carried out on the basis of a relation between the water temperature, the temperature of the fuel and a fuel transport property parameter. As shown in FIG. 6, as the water temperature or the temperature of the fuel are higher, the transport delay of the fuel (a delay until the fuel injected from the fuel injection valve reaches the cylinder) is the more decreased. In this step, as the water temperature or the temperature of the fuel is higher, the map referring water temperature WT as one of the fuel transport property parameters is set to be the higher.

Figure 7:
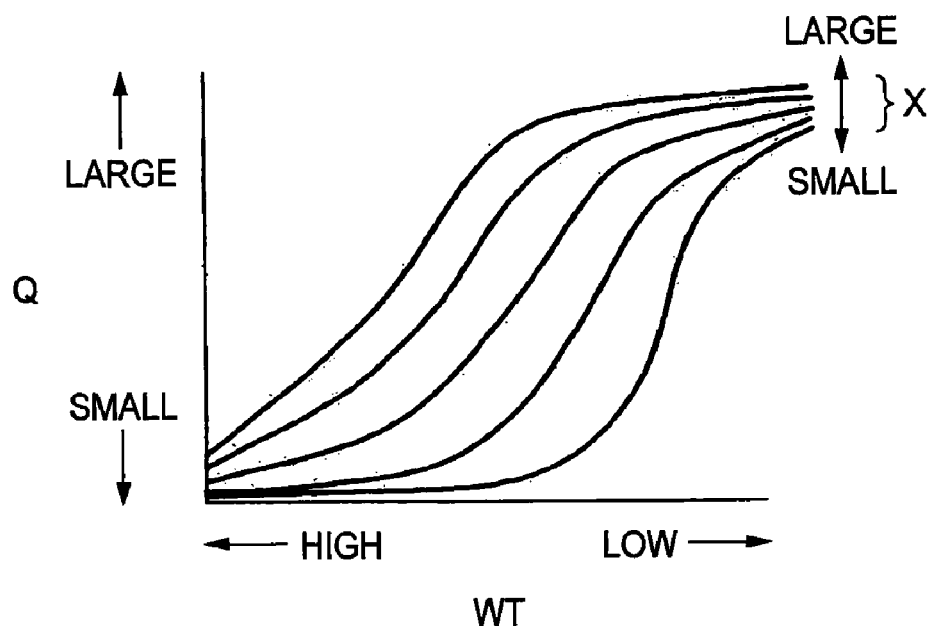
FIG. 7 is a map for calculating a pipe part evaporation rate.
Figure 8:
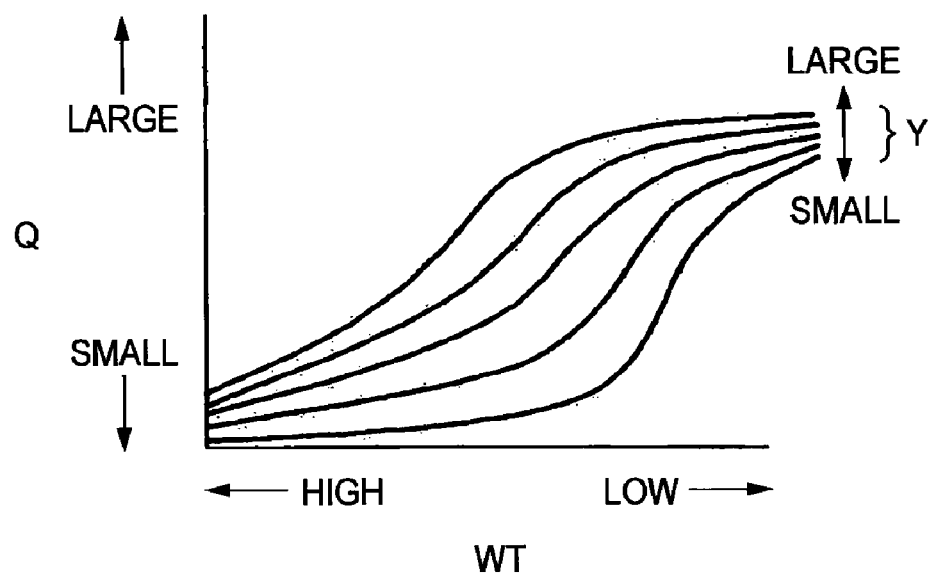
FIG. 8 is a map for calculating a pipe wall evaporation rate.

In the step S40, a valve part evaporation rate X and a pipe wall evaporation rate Y are calculated on the basis of the map referring water temperature WT corrected in the step S30 and an inlet air quantity Q (a valve part evaporation rate calculating unit, a pipe wall evaporation rate calculating unit). The inlet air quantity Q is obtained from a detected value of the air flow sensor 22. The valve part evaporation rate X is calculated by using a map shown in FIG. 7 and the pipe wall evaporation rate Y is calculated by using a map shown in FIG. 8. As shown in FIGS. 7 and 8, when the map referring water temperature WT becomes high and the inlet air quantity Q is increased, the valve part evaporation rate X and the pipe wall evaporation rate Y are increased. Then, the procedure advances to step S50.

In the step S50, a direct transport rate $\alpha cl$ during the closing operation of the inlet valve and a valve part adhesion rate $\beta cl$ are calculated on the basis of the map referring water temperature WT corrected in the step S30 and the inlet air quantity Q. The direct transport rate $\alpha cl$ is calculated by using a map shown in FIG. 9 and the valve part adhesion rate $\beta cl$ is calculated by using a map shown in FIG. 10 (a calculating unit of a direct transport rate during the closure of the valve). Then, the procedure advances to step S60.

In the step S60, a direct transport rate $\alpha op$ during the opening operation of the inlet valve and a valve part adhesion rate $\beta op$ are calculated on the basis of the map referring water temperature WT corrected in the step S30 and the inlet air quantity Q. The direct transport rate $\alpha op$ is calculated by using a map shown in FIG. 11 and the valve part adhesion rate $\beta op$ is calculated by using a map shown in FIG. 12 (a calculating unit of a direct transport rate during the opening of the valve). Then, the procedure advances to step S70.

Figure 9:
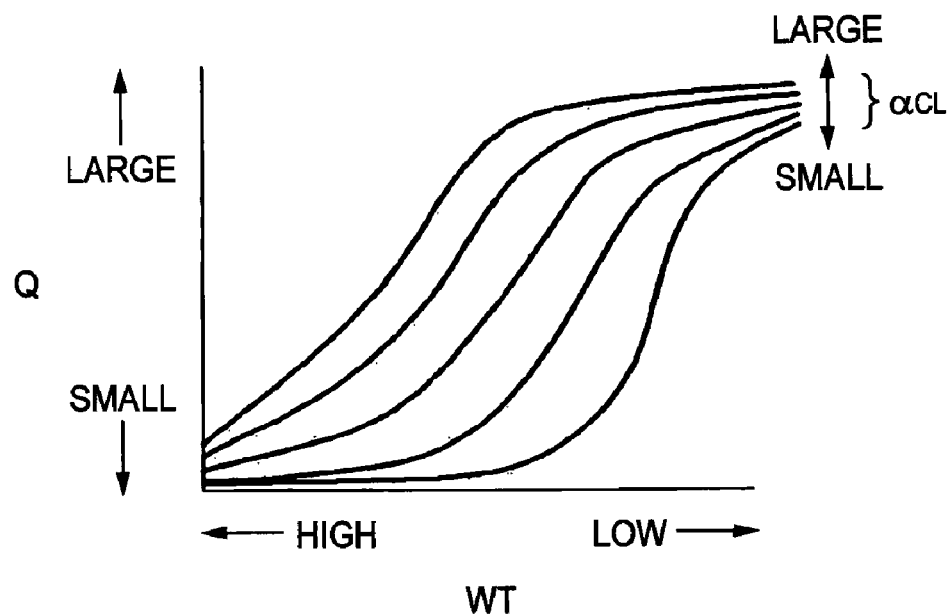
FIG. 9 is a map for calculating a direct transport rate during the closure of an inlet valve.
Figure 10:
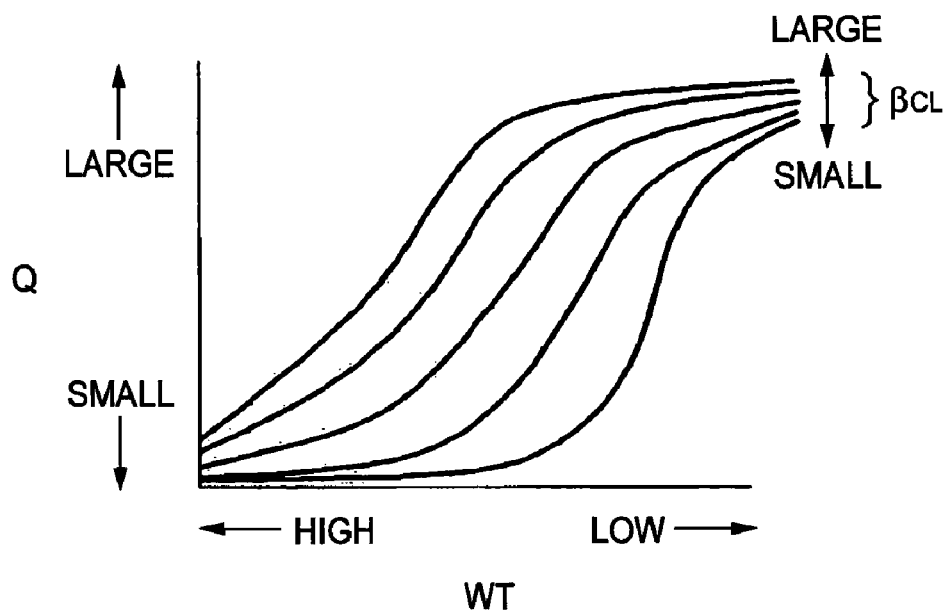
FIG. 10 is a map for calculating a valve part adhesion rate during the closure of the inlet valve.
Figure 11:
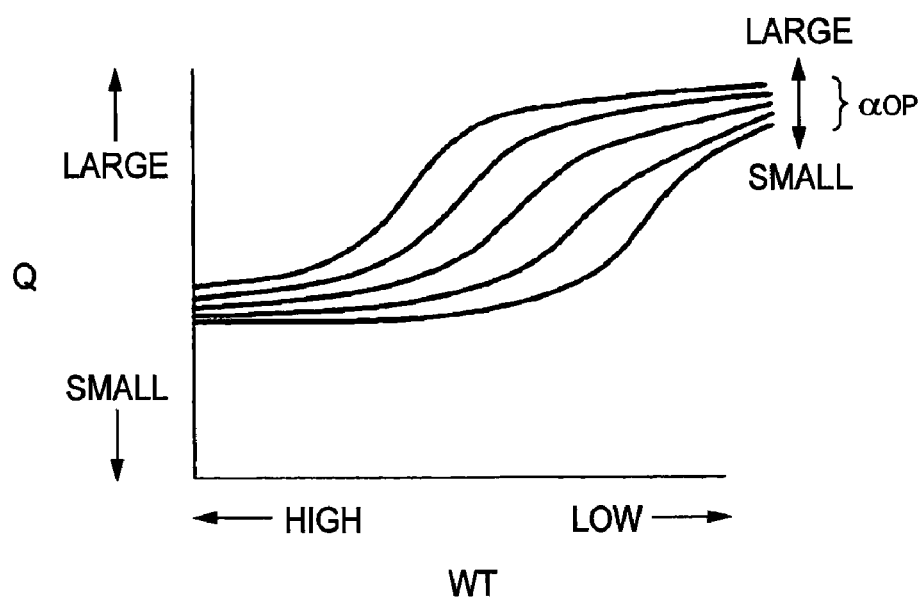
FIG. 11 is a map for calculating a direct transport rate during the opening of the inlet valve.
Figure 12:
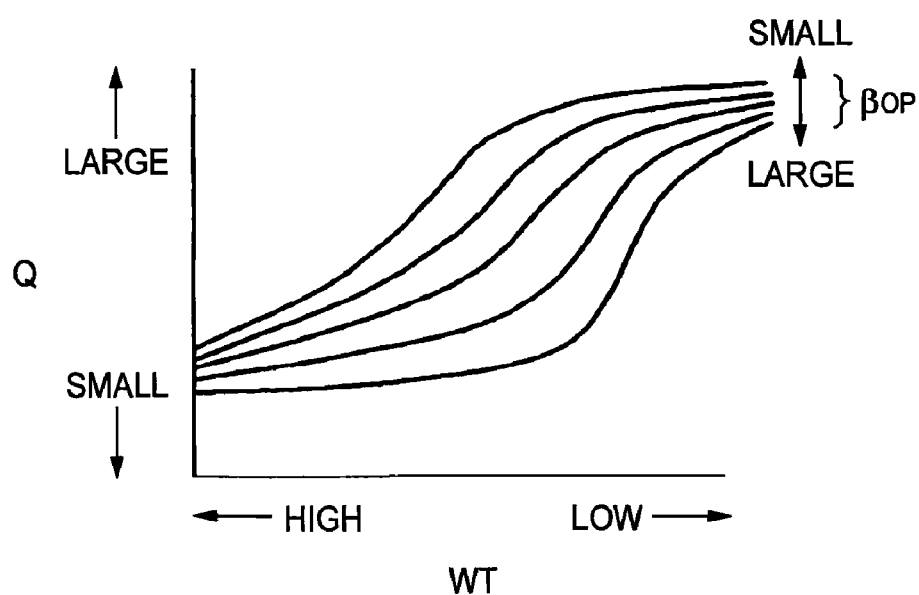
FIG. 12 is a map for calculating a valve part adhesion rate during the opening of the inlet valve.

As shown in FIGS. 9 and 11, when the map referring water temperature WT becomes high and the inlet air quantity Q is increased, the direct transport rates $\alpha cl$ and $\alpha op$ are increased. Further, as shown in FIGS. 10 and 12, when the map referring water temperature WT becomes high and the inlet air quantity Q is increased, the valve part adhesion rates $\beta cl$ and $\beta op$ are increased.

In the step S70, a fuel quantity necessary for a cylinder Tdmn (k) relative to the basic fuel injection quantity Tbase(k) calculated in the step S10, that is, the target fuel quantity is calculated by a below-described equation (1).

$$Tdmn(k)=Tbase(k)-X.Rvalve(k-1)-Y.Rwall(k-1) \quad (1)$$

In the above-described equation (1), are used the valve part evaporation rate X and the pipe wall evaporation rate Y are used and a valve part remaining fuel quantity Rvalve (k−1) and a pipe wall remaining fuel quantity Rwall (k−1) calculated the last time in a below-described step S300. Then, the procedure advances to step S80.

In the step S80, an inlet valve closing period Tcl (k) and an inlet valve opening period Topt(k) are calculated in accordance with below-described equations (2) and (3) (an inlet valve closing period calculating unit, an inlet valve opening period calculating unit). At this time, the inlet valve closing period Tclt(k) and the inlet valve opening period Topt(k) are determined by considering the spraying action of fuel.

$$Tclt(k)=((IO-Td)-(\text{a spray starting angle}) \times (1/(Ne/60 \times 360)) \quad (2)$$

$$Topt(k)=(\min(IC-Td, TL-Td)-(IO-Td) \times (1/(Ne/60 \times 360)) \quad (3)$$

Here, IO designates an inlet valve opening time. IC designates an inlet valve closing time. Td designates a delay time until the fuel injected from the fuel injection valve reaches the inlet valve. TL designates a push-back starting time of the fuel-air mixture in the cylinder and represented by the crank angle. Then, the procedure advances to step S90.

In the step S90, it is discriminated whether or not the fuel quantity necessary for a cylinder Tdmn (k) is satisfied by the fuel quantity directly transported into the cylinder during the inlet valve closing period. Specifically, it is discriminated whether or not a below-described equation (4) is established by using the direct transport rate αcl during the closure of the inlet valve calculated in the step S50, the inlet valve closing period Tclt (k) calculated in the step S80 and the fuel quantity necessary for a cylinder Tdmn(k) calculated in the step S70.

$$\alpha cl.Tclt(k) \geq Tdmn(k) \quad (4)$$

When the above-described equation (4) is established, that is, when the fuel quantity necessary for a cylinder Tdmn (k) is satisfied by the injection of the fuel during the closing period of the inlet valve, the procedure advances to step S100.

In the step S100, a corrected fuel injection quantity Tinj (k) is calculated in accordance with a below-described equation (5). Specifically, the below-described equation (5) is calculated by using the fuel quantity necessary for a cylinder Tdmn (k) calculated in the step S70 and the direct transport rate αcl during the closure of the inlet valve calculated in the step S50. Then, the procedure advances to step S200.

$$Tinj(k)=Tdmn(k)/\alpha cl \quad (5)$$

In the step S90, when the equation (4) is not established, that is, when the fuel quantity necessary for a cylinder Tdmn (k) is not satisfied by the injection of the fuel during the closing period of the inlet valve, the procedure advances to step S110.

In the step S110, it is discriminated whether or not the fuel quantity necessary for a cylinder Tdmn (k) is satisfied by the fuel quantity directly transported into the cylinder both during the closing period of the inlet valve and during the opening period of the inlet valve. Specifically, it is discriminated whether or not a below-described equation (6) is established by using the direct transport rate αcl during the closure of the inlet valve calculated in the step S50, the inlet valve closing period Tclt (k) and the inlet valve opening period Topt(k) calculated in the step S80, the direct transport rate αop during the opening of the inlet valve calculated in the step S60 and the fuel quantity necessary for a cylinder Tdmn(k) calculated in the step S70.

$$\alpha cl.Tclt(k)+\alpha op.Topt(k) \geq Tdmn(k) \quad (6)$$

When the above-described equation (6) is established, that is, the fuel quantity necessary for a cylinder Tdmn (k) is satisfied by the injection of the fuel both during the closing period of the inlet valve and during the opening period of the inlet valve, the procedure advances to step S120.

In the step S120, a corrected fuel injection quantity Tinj (k) is calculated by a below-described equation (7). Specifically, the below-described equation (7) is calculated by using the inlet valve closing period Tclt (k) calculated in the step S80, the fuel quantity necessary for a cylinder Tdmn(k) calculated in the step S70, the direct transport rate αcl during the closure of the inlet valve calculated in the step S50 and the direct transport rate αop during the opening of the inlet valve calculated in the step S60. Then, the procedure advances to the step S200.

$$Tinj(k)=Tclt(k)+(Tdmn(k)-\alpha cl.Tclt(k))/\alpha op. \quad (7)$$

In the step S110, when the equation (6) is not established, that is, when the fuel quantity necessary for a cylinder Tdmn (k) is not satisfied by the injection of the fuel both during the closing period of the inlet valve and during the opening period of the inlet valve, the procedure advances to step S130.

In the step S130, the corrected fuel injection quantity Tinj (k) is calculated by a below-described equation (8). Specifically, the below-described equation (8) is calculated by using the inlet valve opening period Topt (k) calculated in the step S80, the fuel quantity necessary for a cylinder Tdmn(k) calculated in the step S70, the direct transport rate αcl during the closure of the inlet valve calculated in the step S50 and the direct transport rate αop during the opening of the inlet valve calculated in the step S60. Then, the procedure advances to the step S200.

$$Tinj(k)=Topt(k)+(Tdmn(k)-\alpha op.Topt(k))/\alpha cl \quad (8)$$

On the other hand, in the step S20, when it is decided that the adhesion correcting condition is not established, the procedure advances to step S140.

In the step S140, the basic fuel injection quantity Tbase (k) calculated in the step S10 is directly set as the corrected fuel injection quantity Tinj (k). Then,the procedure advances to the step S200.

In the step S200, it is discriminated whether or not the fuel injection quantity (corresponding to the fuel injection time) Tinj calculated or set in the above-described steps S100 and S120 to 140 is an injector minimum driving time Tclp(k) as a minimum drivable time of the fuel injection valve 30 or more.

When the fuel injection quantity Tinj (k) is the injector minimum driving time Tclp(k) or more, the procedure advances to step S220. When the fuel injection quantity Tinj (k) is less than the injector minimum driving time Tclp(k), the procedure advances to step S210.

In the step S210, the fuel injection quantity Tinj(k) is rewritten to the injector minimum driving time Tclp(k) Then, the procedure advances to the step S220.

In the step S220, it is discriminated whether or not the fuel injection quantity Tinj (k) is less than the inlet valve closing period Tclt (k) calculated in the step S80. When the fuel injection quantity Tinj(k) is less than the inlet valve closing period Tclt(k), the procedure advances to step S230.

In the step S230, an injection quantity during the closure of the inlet valve Tinj cl(k) is set to the fuel injection quantity Tinj(k) and an injection quantity during the opening of the inlet valve Tinj op(k) is set to 0. Then, the procedure advances to step S300.

In the step S220, when it is decided that the fuel injection quantity (the fuel injection time) Tinj(k) is the inlet valve closing period Tclt(k) or more, the procedure advances to step S240.

In the step S240, it is discriminated whether or not a below-described equation (9) is established. Specifically, it is discriminated whether or not the fuel injection quantity (the fuel injection time) Tinj(k) is less than the sum of the inlet valve closing period Tclt(k) and the inlet valve opening period Topt(k) calculated in the step S80.

$$Tinj(k) < Tclt(k) + Topt(k) \quad (9)$$

When the equation (9) is established, the procedure advances to step S250.

In the step S250, the injection quantity (the injection time) during the closure of the inlet valve Tinj cl(k) is set to the inlet valve closing period Tclt(k). The injection quantity (the injection time) during the opening of the inlet valve Tinj op(k) is set to Tinj (k)−Tclt(k). Then, the procedure advances to step S300.

In the step S240, the equation (9) is not established, that is, when it is decided that the fuel injection quantity (the fuel injection time) Tinj (k) is more than the sum of the inlet valve closing period Tclt(k) and the inlet valve opening period Topt (k), the procedure advances to step S260.

In the step S260, the injection quantity during the closure of the inlet valve Tinj cl(k) is set Tinj(k)−Topt(k). The injection quantity (the injection time) during the opening of the inlet valve Tinj op(k) is set to the inlet valve opening period Topt (k). Then, the procedure advances to step S300.

In the step S300, a valve part remaining fuel quantity Rvalve (k) is calculated by a below-described equation (10) and a pipe wall remaining fuel quantity RWall (k) is calculated by a below-described equation (11).

$$Rvalve(k)=(1-X).Rvalve(k-1)+(1-\alpha cl). \beta cl.Tinj\ cl(k)+ (1-\alpha op). \beta op.\ Tinj\ op(k). \quad (10)$$

$$Rwall(k)=(1-Y).Rwall(k-1)+(1-\alpha cl).\ (1-\beta cl).Tinj\ cl(k)+(1-\alpha op).(1-\beta op).\ Tinj\ op(k). \quad (11)$$

Then, this routine is finished.

By carrying out the control as described above, in this embodiment, the fuel quantity necessary for a cylinder Tdmn (k) is calculated so that the fuel of the basic fuel injection quantity Tbase(k) is transported into the cylinder. The fuel quantity necessary for a cylinder Tdmn(k) is obtained by subtracting a valve part evaporation quantity that is obtained by multiplying the valve part remaining fuel quantity Rvalve (k) by the valve part evaporation rate X and a pipe wall evaporation quantity that is obtained by multiplying the pipe wall remaining fuel quantity RWall(k) by the pipe wall evaporation rate Y from the basic fuel injection quantity Tbase (k).

The valve part remaining fuel quantity Rvalve(k) is obtained by adding (1−αcl). βcl.Tinj cl(k) as the valve part remaining fuel quantity during the closure of the inlet valve and (1−αop). βop. Tinj op(k) as the valve part remaining fuel quantity during the opening of the inlet valve to the quantity that does not evaporate and remains in a valve part(1−X) .Rvalve(k−1) of the valve part remaining fuel quantity Rvalve (k−1) calculated the last time. The valve part remaining fuel quantities during the closure of the inlet valve and during the opening of the inlet valve are respectively calculated by using the direct transport rates and the valve part adhesion rates.

Similarly, the pipe wall remaining fuel quantity Rwall(k) is obtained by adding (1−αcl).(1−βcl).Tinj cl(k) as the pipe wall remaining fuel quantity during the closure of the inlet valve and (1−αop). (1−βop). Tinj op(k) as the pipe wall remaining fuel quantity during the opening of the inlet valve to the quantity that does not evaporate and remains in a pipe wall (1−Y).Rwall (k−1) of the pipe wall remaining fuel quantity Rwall (k−1)calculated the last time.

Namely, in this embodiment, the direct transport rates and the valve part adhesion rates are respectively calculated during the opening of the inlet valve and during the closure of the inlet valve, and the valve part remaining fuel quantity and the pipe wall remaining fuel quantity are calculated on the basis of them. Since the flowing state of the inlet air in the inlet pipe is extremely different between the opening state and the closing state of the in let valve, the fuel injection quantity is corrected by using respectively the direct transport rates and the valve part adhesion rates separately during the opening of the inlet valve and during the closure of the inlet valve, as in this embodiment. Thus, the necessary quantity of the fuel can be precisely transported into the cylinder.

Especially, since the fuel injection quantity is corrected by using the direct transport rates during the opening of the inlet valve and during the closure of the inlet valve, the correction can be realized by considering adequately the change of the transport state of the fuel into the cylinder depending on the opening and closing states of the inlet valve. Particularly, even when the engine 1 is in a transient operation state, the fuel injection quantity can be precisely controlled.

Further, in this embodiment, the fuel injection during the closing period of the inlet valve and the fuel injection during the closing period of the inlet valve and during the opening period of the inlet valve are separately used in accordance with the fuel quantity necessary for a cylinder Tdmn(k). Further, when the necessary fuel injection quantity is not satisfied even by the fuel injection during the closing period of the inlet valve and during the opening period of the inlet valve, the fuel is further continuously injected even after the opening period. This, even when a large quantity of fuel injection is necessary, such a fuel injection quantity can be adequately met.

The present invention can be applied to a vehicle using ethanol mixed fuel. In the ethanol mixed fuel, since the transport property of the fuel is changed due to the mixture ratio of gasoline and ethanol, the fuel transport property parameter is calculated not only on the basis of the map referring water temperature WT and the inlet air quantity Q, but also on the basis of the mixture ratio.

Specifically, as maps for calculating various kinds of fuel transport property parameters such as the direct transport rate, the valve part adhesion rate and the evaporation rate, for instance, a map for E85 (85% ethanol) is previously stored as well as maps for EO (100% gasoline) shown in FIGS. 7 to 12. These two maps and an interpolating coefficient map are used to calculate the fuel transport property parameters respectively on the basis of a concentration of alcohol. Specifically, when the fuel transport property parameters are calculated in the steps S40 to S60 of the first embodiment, the fuel transport property parameter A from the map for EO, the fuel transport property parameter B from the map for E85 and an interpolating coefficient K obtained from the interpolating coefficient map are used to calculate a below-described equation (12) and calculate the various kinds of fuel transport property parameters.

$$\text{Fuel transport property parameter} = A \times (1-K) + B \times K \quad (12)$$

Figure 13:
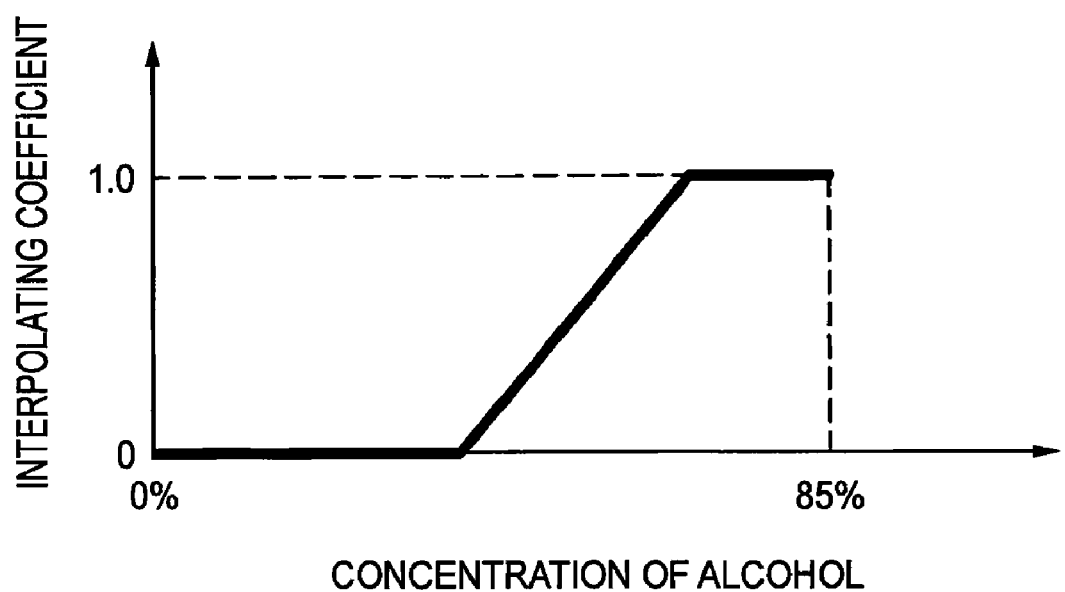
FIG. 13 is a map for calculating an interpolating coefficient of a fuel transport property parameter in mixed fuel.

The interpolating coefficient map is a map showing the interpolating coefficient K to the concentration of alcohol as shown in FIG. 13. The concentration of alcohol may be obtained by setting by a driver during the supply of the fuel or by detecting by an alcohol concentration sensor.

As described above, since the fuel transport property parameter is corrected on the basis of the concentration of alcohol, the fuel injection quantity of the engine using the ethanol mixed fuel of respective mixed ratios can be properly obtained.

According to the fuel injection controller for an internal combustion engine of the present invention, since the direct transport rates are respectively calculated separately during the opening of the inlet valve and during the closure of the inlet valve, and the basic fuel injection quantity is corrected on the basis of these direct transport rates, the fuel injection quantity can be corrected by considering the change of the transport state of the fuel into the cylinder due to the opening and closing operations of the inlet valve. Thus, the fuel injection quantity can be precisely controlled.

According to the fuel injection controller for an internal combustion engine of the present invention, when the basic fuel injection quantity is small and can be sufficiently supplied by the injection of the fuel within the closing period of the inlet valve, since the basic fuel injection quantity is corrected on the basis of the direct transport rate during the closure of the valve, the correction is properly carried out by considering the transport state of the fuel into the cylinder during the closure of the inlet valve. Thus, the fuel injection quantity can be precisely controlled during the closing period of the inlet valve.

According to the fuel injection controller for an internal combustion engine of the present invention, the closing period of the inlet valve can be more precisely obtained by considering the action of the fuel injection.

According to the fuel injection controller for an internal combustion engine of the present invention, when the basic fuel injection quantity is satisfied by the injection of the fuel within the closing period and the opening period of the inlet valve, since the basic fuel injection quantity is corrected on the basis of the direct transport rate during the closure of the valve in the closing period of the inlet valve and on the basis of the direct transport rate during the opening of the valve in the opening period of the inlet valve, the correction is properly carried out by considering the transport states of the fuel into the cylinder during the closure and during the opening of the inlet valve. Thus, the fuel injection quantity can be precisely controlled in the closing period and the opening period of the inlet valve.

According to the fuel injection controller for an internal combustion engine of the present invention, the opening period of the inlet valve can be more precisely obtained by considering the action of the fuel injection.

According to the fuel injection controller for an internal combustion engine of the present invention, when the basic fuel injection quantity is not satisfied by the injection of the fuel within the closing period and the opening period of the inlet valve, since the fuel is additionally injected after the opening period of the inlet valve, the fuel injection quantity necessary for the cylinder is generally sufficiently ensured.

According to the fuel injection controller for an internal combustion engine of the present invention, since the basic fuel injection quantity is corrected by considering the evaporation rate of the fuel on the wall surface forming the inlet passage and the evaporation rate of the fuel adhering to the inlet valve, the fuel injection quantity can be more precisely controlled.

According to the fuel injection controller for an internal combustion engine of the present invention, since the basic fuel injection quantity is corrected on the basis of the temperature of the fuel, the fuel injection quantity can be more precisely controlled in accordance with the change of the fuel temperature.

According to the fuel injection controller for an internal combustion engine of the present invention, since the basic fuel injection quantity is corrected on the basis of the inlet air temperature, the fuel injection quantity can be more precisely controlled in accordance with the change of the inlet air temperature.

What is claimed is:

1. A fuel injection controller for an engine that injects fuel to an inlet passage in an upstream side of an inlet valve from a fuel injection unit, the fuel injection controller comprising:
   a first calculator, configured to calculate a basic fuel injection quantity from the fuel injection unit based on an operating condition of the engine;
   a second calculator, configured to calculate a first direct transport rate of fuel directly transported into a cylinder of the fuel injected from the fuel injection unit when the inlet valve is closed;
   a third calculator, configured to calculate a second direct transport rate of fuel directly transported into the cylinder of the fuel injected from the fuel injection unit when the inlet valve is opened; and
   a corrector, configured to correct the basic fuel injection quantity based on the first direct transport rate and the second direct transport rate.

2. The fuel injection controller according to claim 1, further comprising:
   a fourth calculator, configured to calculate a closing period of the inlet valve; wherein:
   the corrector calculates a first fuel transportable quantity into the cylinder by the injection of the fuel within the closing period; and
   when the basic fuel injection quantity falls within a range no more than the first fuel transportable quantity, the corrector corrects the basic fuel injection quantity based on the first direct transport rate.

3. The fuel injection controller according to claim 2, wherein
   the fourth calculator calculates the closing period based on a start time of the closing period and a delay time until the fuel injected from the fuel injection unit reaches the inlet valve.

4. The fuel injection controller according to claim 3, further comprising
   a fifth calculator, configured to calculate an opening period of the inlet valve; wherein
   the corrector calculates a second fuel transportable quantity into the cylinder by the injection of the fuel within the closing period and within the opening period; and
   when the basic fuel injection quantity falls within a range no less than the first fuel transportable quantity and a range no more than the second fuel transportable quantity, the corrector corrects the fuel injection quantity in the closing period based on the first direct transport rate, and corrects the fuel injection quantity in the opening period based on the second direct transport rate.

5. The fuel injection controller according to claim 4, wherein:
   the fifth calculator calculates the opening period based on the start time of the closing period, a start time of the opening period, the delay time and a time at which an air-fuel mixture mixed in the cylinder begins to return to the inlet passage side.

6. The fuel injection controller according to claim 1, wherein:

the corrector calculates a fuel transportable quantity into the cylinder by the injection of the fuel in the closing period and in the opening period; and when the fuel transportable quantity is lower than the basic fuel injection quantity, the corrector controls the fuel injection unit to inject the fuel even in the closing period after the opening period.

7. The fuel injection controller according to claim 1, further comprising:

a sixth calculator, configured to calculate a pipe wall evaporation rate as a rate of the evaporation of the fuel adhering to a wall surface forming the inlet passage; and a seventh calculator, configured to calculate a valve part evaporation rate as a rate of the evaporation of the fuel adhering to the inlet valve, wherein the corrector corrects the basic fuel injection quantity based on the pipe wall evaporation rate and the valve part evaporation rate.

8. The fuel injection controller according to claim 1, further comprising a first detector, configured to detect a temperature of the fuel injected from the fuel injection unit, wherein the corrector corrects the basic fuel injection quantity based on the temperature.

9. The fuel injection controller according to claim 1, further comprising an second detector, configured to detect an inlet air temperature, wherein the corrector corrects the basic fuel injection quantity based on the inlet air temperature.

* * * * *